(12) United States Patent
Sinivaara

(10) Patent No.: US 7,509,129 B2
(45) Date of Patent: Mar. 24, 2009

(54) LOAD BALANCING IN WIRELESS COMMUNICATION NETWORK

(75) Inventor: Hasse Sinivaara, Espoo (FI)

(73) Assignee: Nokia Corporation, Espoo (FI)

( * ) Notice: Subject to any disclaimer, the term of this patent is extended or adjusted under 35 U.S.C. 154(b) by 368 days.

(21) Appl. No.: 10/518,526

(22) PCT Filed: Jun. 26, 2002

(86) PCT No.: PCT/IB02/02312

§ 371 (c)(1),
(2), (4) Date: Feb. 2, 2005

(87) PCT Pub. No.: WO2004/004227

PCT Pub. Date: Jan. 8, 2004

(65) Prior Publication Data

US 2005/0208950 A1    Sep. 22, 2005

(51) Int. Cl.
*H04Q 7/20* (2006.01)
(52) U.S. Cl. ............... 455/453; 455/432.1; 455/450; 455/452.1; 370/329
(58) Field of Classification Search ........... 455/453, 455/452.1, 432.1, 450; 370/329
See application file for complete search history.

(56) References Cited

U.S. PATENT DOCUMENTS 5,815,811 A * 9/1998 Pinard et al. ............... 455/434
6,148,210 A * 11/2000 Elwin et al. ............... 455/453
6,980,533 B1 * 12/2005 Abraham et al. ........... 370/329
7,146,636 B2 * 12/2006 Crosbie ..................... 726/7
7,173,918 B2 * 2/2007 Awater et al. .............. 370/332

FOREIGN PATENT DOCUMENTS

EP    1 156 623 A1    11/2001
WO   WO 02/41587 A2   5/2002

OTHER PUBLICATIONS

Lo et al, "QoS Provisioning in handoff algorithms for wireless LAN", 1998 International Zurich Seminar on Broadband Communications. Accessing, Transmission, Networking. Proceedings (Cat. No. 98th 8277), Feb. 1998, pp. 9-16, XP002230196.

* cited by examiner

*Primary Examiner*—Nghi H Ly
(74) *Attorney, Agent, or Firm*—Squire, Sanders, & Dempsey L.L.P.

(57) ABSTRACT

For load balancing in a wireless communication network comprising at least one subscriber terminal (T1, T2, T2) and a plurality of access points (AP1, AP2, AP3), a load control device (21; 110) is used which is located outside of said subscriber terminal, wherein said load control device is adapted to process information related to a load in said wireless communication network and to instruct roaming of said subscriber terminal from an associated access point to another one of said plurality of access points. Access point status information (APST) determined in said plurality of access points (S10; S110) is received and communication status information related to said plurality of access points (S20; S120) is determined. The subscriber terminal processes (S20; S120) these information into roaming support information (RSUP), which are in turn processed (S40; S160) in said load control device an access point related load based roaming analysis. On this basis, it is decided (S50; S170) by the load control device, whether said subscriber terminal is to be associated with another one of said plurality of access points.

9 Claims, 7 Drawing Sheets

LOAD BALANCING IN WIRELESS COMMUNICATION NETWORK

FIELD OF THE INVENTION

The present invention relates to a method for load balancing in a wireless communication network, a corresponding system, a load control device, a corresponding access point usable in a wireless communication network, a corresponding network element usable in a wireless communication network, a corresponding subscriber terminal usable in a wireless communication network and a computer program product for implementing the method for load balancing in a wireless communication network.

BACKGROUND OF THE INVENTION

In the last years wireless communication networks, for example for data and/or speech transmissions, became more and more important. One example for such a wireless communication network is a wireless local area network (WLAN), independent of a radio frequency or the like (infrared etc.) used for this network. In such a WLAN, subscriber terminals, such as personal computers, telecommunication equipments, mobile phones, personal digital assistants and the like, are able to perform communications with each other or with corresponding subscriber terminals of other networks (for example wired LANs, WLANs, fixed or mobile telecommunication networks and the like) via corresponding communication protocols.

The general architecture of a WLAN is commonly known and thus described only shortly. The key elements of a WLAN are the subscriber terminals and access points (AP) with which the subscriber terminal communicates over a wireless communication interface, e.g. radio or infrared based. An access point covers a specific area, which is referred to hereinafter as a cell. The size of a cell may vary in dependence of the environment, network operator specifications, number of associated subscribers and the like. The AP is adapted to control communications of the subscriber terminals within this cell, for example, by allocating frequency channels, establishing connections for the subscriber terminals, forwarding data to a destination terminal and the like. A subscriber terminal is normally associated with one access point, which is referred to hereinafter as the serving AP. Furthermore, a distribution network is provided to which the access points are connected. Via the distribution network, communication connections between different APs or external networks (e.g. fixed networks, mobile telecommunications networks such as GSM, UMTS, and the like) can be established for a subscriber terminal. In the case of mobile subscriber terminals, there is a case that a subscriber terminal leaves the cell of its serving AP. In this case, roaming is executed. Roaming means that the subscriber terminal searches an available AP whose connection quality is better than a predetermined threshold or the like and switches the connection to this other available AP, which becomes the serving AP. The decision whether a roaming is to be executed is based, for example, on signal strength measurements and the like. WLANs are implemented according to specific standards. One of these standards is, for example, the IEEE (Institute of Electrical and Electronics Engineers) 802.11 standard or its respective extensions such as the IEEE 802.11h standard, which are commonly known to persons skilled in the art.

In the IEEE 802.11 standards, in particular MAC (MAC: Medium Access Control) and PHY (PHYsical layer) protocols are defined. MAC protocol is used, for example, to allow interoperability between compatible physical layers, to reduce a collision probability between different subscriber terminals, and the like. Moreover, the IEEE 802.11 MAC protocol defines beacon frames sent at regular intervals by the access point to allow stations to monitor the presence of the access point. The IEEE 802.11 MAC protocol also gives a set of management frames including Probe Request frames which are sent by a subscriber terminal and are followed by Probe Response frames sent by an available access point, to allow a subscriber terminal to scan actively if there is an access point operating on a certain channel frequency and to show to the subscriber terminal what parameter settings this access point is using. Additionally, a MAC address is provided which is used as an identification element for the respective WLAN elements.

According to the prior art, roaming of a subscriber terminal from one AP to another AP is initialized on the basis of specific configuration settings in the wireless communication network. In accordance with these configuration settings, a subscriber terminal will decide on the basis of communication reception quality measurements whether the recent reception quality is sufficient or not. If not, a commonly known roaming procedure will be initialized by the subscriber terminal.

However, according to this conventional roaming procedure, a load situation in the wireless communication network is not considered in the decision for roaming. In other words, a subscriber terminal could be switched or associated with an AP in which the load situation is such that the communication connection quality is not satisfying. Thus, in conventional wireless communication networks, the load is not balanced between the respective APs.

In document EP 1 156 623 A1, a wireless LAN is described in which the roaming procedure is added by a load balancing function. In order to balance the load within the WLAN, the subscriber terminal receives load information concerning the loading status of the access point from access points. Then, the subscriber terminal may select a communication connection with one of the access points by using a cost function in which the received load information is considered.

However, in specific situations, there might arise a problem in that the load based roaming procedure is not performed in an advantageous manner. In a cellular type of environment the client might be "hesitant" to select the correct cell on the basis of conventional measurement information. Thus, there might be a case that the subscriber terminal has measurement information on hand which causes a very easy or frequent change of the cell, i.e. of the serving AP. In particular in the middle of a transmission this causes undesired pauses to applications, e.g. data transmissions or the like. Typically the roaming in WLAN cells requires some time when changing from serving AP to the neighbor AP. In other words, the effect of such easy roaming is a "stopped" application that continues not until the signaling has been performed in the roaming state. In particular when the subscriber terminal is located in a densely utilized wireless network environment (i.e. a plurality of subscriber terminals is communicating in the respective cells) there could be a so-called "ping-pong" effect. In other words, the decision to change the serving access for the subscriber terminal is made rather frequently and even such that the same two APs are involved in the roaming.

SUMMARY OF THE INVENTION

Accordingly, it is an object of the present invention to achieve an improved load balancing in a wireless communication network.

This object is achieved, for example, by a method of load balancing in a wireless communication network, said wireless communication network comprising at least one subscriber terminal adapted to establish and perform a wireless communication connection in said wireless communication network, a plurality of access points adapted to control said wireless communication connection of said at least one subscriber terminal and to exchange information with said at least one subscriber terminal, wherein one of said plurality of access points is associated with said at least one subscriber terminal, and a load control device located outside of said subscriber terminal, said load control device being adapted to process information related to a load in said wireless communication network and to instruct roaming of said subscriber terminal from said associated one of said plurality of access points to another one of said plurality of access points, said method comprising the steps of receiving, in said subscriber terminal, access point status information determined in said plurality of access points, determining communication status information related to said plurality of access points, and processing said received access point status information and said communication status information in order to obtain roaming support information, processing, in said load control device, said roaming support information by an access point related load based roaming analysis and deciding, on the basis of a result of said access point related load based roaming analysis, whether said subscriber terminal is to be associated with another one of said plurality of access points, and if so, initializing roaming of said subscriber terminal to said another one of said plurality of access points in said wireless communication network.

Furthermore, this object is achieved, for example, by a system for load balancing in a wireless communication network, said wireless communication network comprising at least one subscriber terminal adapted to establish and perform a wireless communication connection in said wireless communication network, and a plurality of access points adapted to control said wireless communication connection of said at least one subscriber terminal and to exchange information with said at least one subscriber terminal, wherein one of said plurality of access points is associated with said at least one subscriber terminal, said, system comprising access point load status monitoring means located in each one of said plurality of access points and adapted to measure a traffic load of an access point and to transmit access point status information, roaming support means located in said subscriber terminal and adapted to receive said access point status information from said plurality of access points, to determine communication status information related to said plurality of access points, to process said received access point status information and said communication status information in order to obtain roaming support information, and to transmit said roaming support information, and a load control device located outside of said subscriber terminal, said load control device being adapted to process said roaming support information by an access point related load based roaming analysis, to decide, on the basis of a result of said access point related load based roaming analysis, whether said subscriber terminal is to be associated with another one of said plurality of access points, and to initialize roaming of said subscriber terminal from said associated one to said another one of said plurality of access points in said wireless communication network.

Moreover, this object is achieved, for example, by a load control device for load balancing in a wireless communication network, said wireless communication network comprising at least one subscriber terminal adapted to establish and perform a wireless communication connection in said wireless communication network, and a plurality of access points adapted to control said wireless communication connection of said at least one subscriber terminal and to exchange information with said at least one subscriber terminal, wherein one of said plurality of access points is associated with said at least one subscriber terminal, wherein said load control device is located outside of said subscriber terminal and adapted to process roaming support information, received from a subscriber terminal and derived by said subscriber terminal from access point status information of said plurality of access points, by an access point related load based roaming analysis, to decide, on the basis of a result of said access point related load based roaming analysis, whether said subscriber terminal is to be associated with another one of said plurality of access points, and to initialize roaming of said subscriber terminal from said associated one to said another one of said plurality of access points in said wireless communication network.

Furthermore, this object is achieved, for example, by an access point usable in a wireless communication network, said wireless communication network comprising at least one subscriber terminal adapted to establish and perform a wireless communication connection in said wireless communication network and further access points, said access point being adapted to control said wireless communication connection of said at least one subscriber terminal and to exchange information with said at least one subscriber terminal, wherein said access point comprises access point load status monitoring means adapted to measure a traffic load of an access point and to transmit access point status information, and a load control device as defined above.

Moreover, this object is achieved, for example, by a network element usable in a wireless communication network, said wireless communication network comprising at least one subscriber terminal adapted to establish and perform a wireless communication connection in said wireless communication network, and a plurality of access points adapted to control said wireless communication connection of said at least one subscriber terminal and to exchange information with said at least one subscriber terminal, wherein one of said plurality of access points is associated with said at least one subscriber terminal, wherein said network element is separated from and connected to said plurality of access points and comprises a load control device as defined above.

Furthermore, this object is achieved, for example, by a subscriber terminal usable in a wireless communication network, said wireless communication network comprising a plurality of access points adapted to control a wireless communication connection of said subscriber terminal and to exchange information with said subscriber terminal, wherein one of said plurality of access points is associated with said subscriber terminal, said subscriber terminal comprising roaming support means adapted to receive access point status information from said plurality of access points, to determine communication status information related to said plurality of access points, to process said received access point status information and said communication status information in order to obtain roaming support information, and to transmit said roaming support information to a load control device as defined above, wherein said subscriber terminal performs, in response to an instruction from said load control device, roaming from said associated one to another one of said plurality of access points in said wireless communication network, said another one of said plurality of access points is indicated in said instruction from said load control device.

Moreover, this object is achieved, for example, by a computer program product usable for a data processing apparatus, comprising software code portions for performing the steps of the method of load balancing defined above when said product is run on said data processing apparatus.

Advantageous further developments of the present invention are as set out in the respective dependent claims.

The present invention is particularly useful to balance the load situation in wireless communication networks in such a manner that a subscriber terminal may perform a roaming to another AP in order to achieve a better data throughput even if the signal strength situation would not require such a change of the serving AP. Thus, the capacity of APs available for the subscriber terminal is used in an improved manner. Furthermore, a so-called ping-pong effect during a roaming procedure for a subscriber terminal can be suppressed.

Load balancing according to the present invention is useful, for example, in a WLAN environment, e.g. according to the IEEE 802.11 standard and its extensions, such as IEEE 802.11h.

The access point status information may comprise an access point identification element, such as a MAC address and an access point load status indicator, which is determined for each access point and defines a load situation for the access point.

Communication status information determined, for example, in the subscriber terminal may comprise a received signal strength indicator RSSI indicating the received signal strength for communications between access points and said subscriber terminal. Furthermore, a carrier to interference ratio C/I per each access point may be determined for the communication status information. Additionally, a terminal transmit power status may be determined for the communication status information.

The roaming support information may be obtained in the subscriber terminal by processing the received access point status information and the communication status information. It may comprise statistics (tables or lists) of access point related communication status and load information derived or measured from the received access point status information, such as RSSI statistics, C/I statistics, load status information, AP/client transmit power status statistics and the like, which are allocated to the respective access points by the an access point identification element.

The roaming support information may be processed in the access point related load based roaming analysis by using a hand-off algorithm. Thereby, load and connection quality situations are calculated for the connections between the subscriber terminal and the available access points on the basis of the roaming support information. Thus, an optimal access point for being associated with the subscriber terminal can be determined on the basis of the respective load and connection quality situations.

Furthermore, processing parameters used in the access point related load based roaming analysis, for example in the hand-off algorithm, which are derived from the roaming support information, may be differently weighted. For example, parameters associated with a connection quality situation are provided with a higher priority than parameters associated with the load situation. Thus, operator specific settings for roaming and load balancing are further improved.

The load control functionality may be provided in different sites. For example, the access points may comprise the load control functionality. Alternatively, the load control may be located in a specific network element separated from the access points, wherein this network element is connected with the access points in the wireless communication network.

As a further refinement, access point internal monitoring information determined in the access points may be used for the load control. The load control functionality determines, for example, access points which are available for said subscriber terminal, e.g. by comparing the access point identification elements in the roaming support information, and selects only the access point internal monitoring information of such available access points. Then the load control processes the roaming support information and the selected access point internal monitoring information by means of an enhanced access point related load based roaming analysis. On the basis of a result of the enhanced access point related load based roaming analysis, it is decided whether the subscriber terminal is to be associated with another access point. If this is the case roaming of the subscriber terminal to this other access point in said wireless communication network is initialized.

The access point internal monitoring information determined by the access points comprises, for example, a retransmit rate to associated subscriber terminals, back-off windows, and/or a net allocation vector for the access point. By means of this, external interference statistics can be considered in the enhanced access point related load based roaming analysis which in turn improves decisions for roaming and load balancing in the wireless communication network.

Similarly to the access point related load based roaming analysis defined above, in the enhanced access point related load based roaming analysis processing, parameters used therein and derived from the roaming support information and the selected access point internal monitoring information may be differently weighted. Thus, operator specific settings for roaming and load balancing are further improved.

Preferred embodiments of the invention are described herein below in detail by way of example with reference to the accompanying drawings.

DESCRIPTION OF PREFERRED EMBODIMENTS

A first embodiment of the present invention is described with reference to FIGS. 1, 2 and 3.

Figure 1:
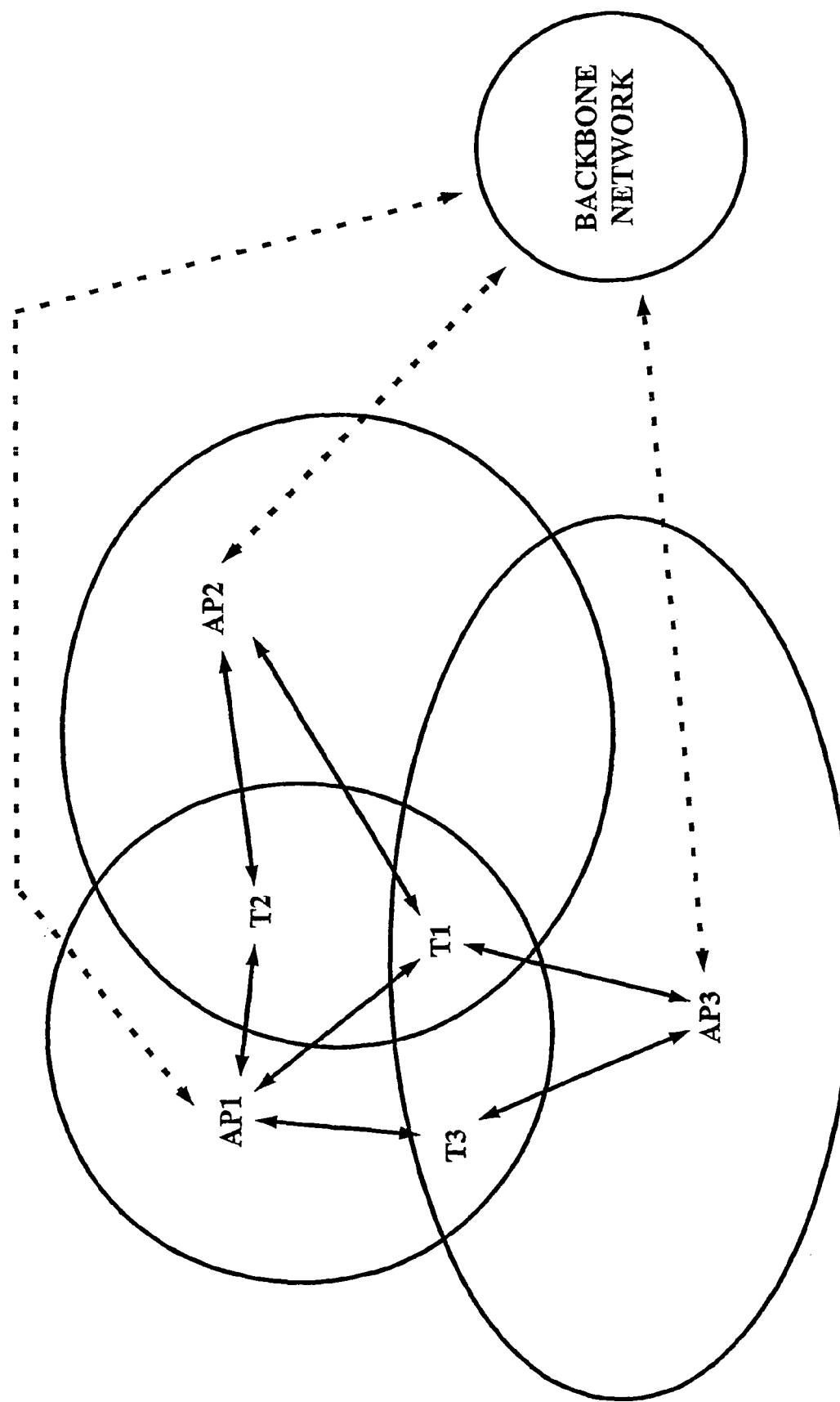
FIG. 1 shows a schematic diagram of a WLAN network according to a first embodiment of the present invention.

Referring to FIG. 1, a wireless communication network such as a WLAN comprises several access points AP1, AP2, AP3 as communication control elements. Furthermore, in the example shown, a backbone network is provided which serves as a distribution network for connecting the APs to one another and to external destination points such as other WLANs or fixed networks. For connecting the APs to the backbone network, commonly known input/output (I/O) interfaces are used.

Each of the APs defines a cell of a specific size (indicated by the circles surrounding the APs). Subscriber terminals T1, T2, T2 within the network may be associated (connected) with one AP (serving AP) in whose cell they are located. In the present example, as the starting situation, subscriber terminal T1 is associated with AP1, T2 is associated with AP2, and T3 is associated with AP3.

Irrespective of its specific type (e.g. personal computer, mobile phone and the like) a subscriber terminal comprises several means (not shown) which are required for its communication functionality and which are known to those skilled in the art. Such means are for example a processor for executing instructions and processing data for the communication connection (e.g. transmission content and signaling related data), memory means for storing instructions and data, for serving as a work area of the processor and the like (e.g. ROM, RAM, EEPROM, and the like), input means for inputting data and instructions by software (e.g. floppy disk, CD-ROM, EEPROM, and the like), user interface means for providing monitor and manipulation possibilities to a user (e.g. a screen, a keyboard, a microphone and headset for communication, and the like), and network interface means for establishing a communication connection under the control of the processor (e.g. and wireless interface means, an antenna, and the like). These means can be integrated within one device (e.g. in case of a mobile telephone) or in several devices forming the subscriber terminal (e.g. in case of a personal computer).

Similarly, an access point comprises several means (not shown) which are required for its communication functionality and which are known to those skilled in the art. Such means are for example a processor for executing instructions and processing data for the communication connection (e.g. transmission forwarding and signaling related data), memory means for storing instructions and data, for serving as a work area of the processor and the like (e.g. ROM, RAM, EEPROM, and the like), input means for inputting data and instructions by software (e.g. floppy disk, CD-ROM, EEPROM, and the like), user interface means for providing monitor and manipulation possibilities to a user (e.g. a screen, a keyboard, and the like), network interface means for establishing a communication connection with subscriber terminals under the control of the processor (e.g. and wireless interface means, an antenna, and the like), distribution network interface means for communicating via the backbone network with other APs under the control of the processor, and the like. Besides a dedicated communication connection with an associated subscriber terminal, the AP is adapted to, transmit signaling data within its cell, which enables to determine connection quality information related to this AP. This may be performed by means of a beacon frame, which is sent permanently or in specific intervals.

In the WLAN depicted in FIG. 1, a subscriber terminal receives this signaling data from those APs in whose cells it is located. This means, T1 receives signaling data from AP1, AP2, AP3, T2 receives signaling data from AP1, AP2, and T3 receives signaling data from AP1, AP3. On the other hand, the subscriber terminal sends data to its respective serving AP. The signaling data may be used to determine the connection quality situation for the subscriber terminal, i.e. whether there is an AP other than the current serving AP, which provides a better communication situation. In such a case, the subscriber terminal initializes a roaming procedure in order to associate with the other AP, as known in the prior art and described, for example, in connection with the respective standards of wireless communication networks.

Additional to this "normal" roaming procedure, according to the present embodiment, there is provided a further functionality which is adapted to initialize a roaming procedure on the basis of a load situation in the WLAN, i.e. to perform a load balancing. For this purpose, the signaling data comprises load information determined in the APs, which is associated with an identification element identifying the sending AP.

Figure 2:
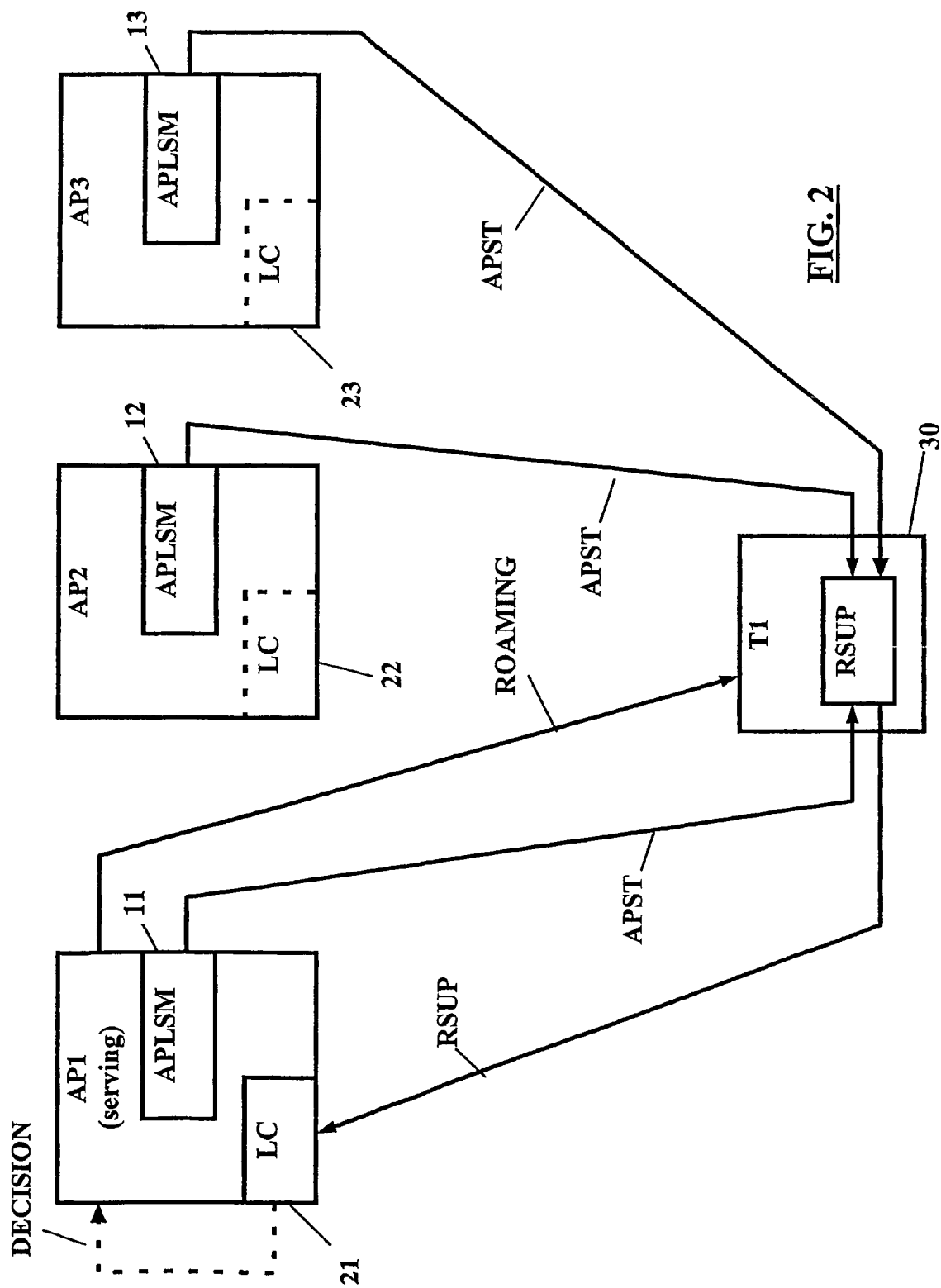
FIG. 2 shows a block circuit diagram of a load balancing system according to the first embodiment.
Figure 3:
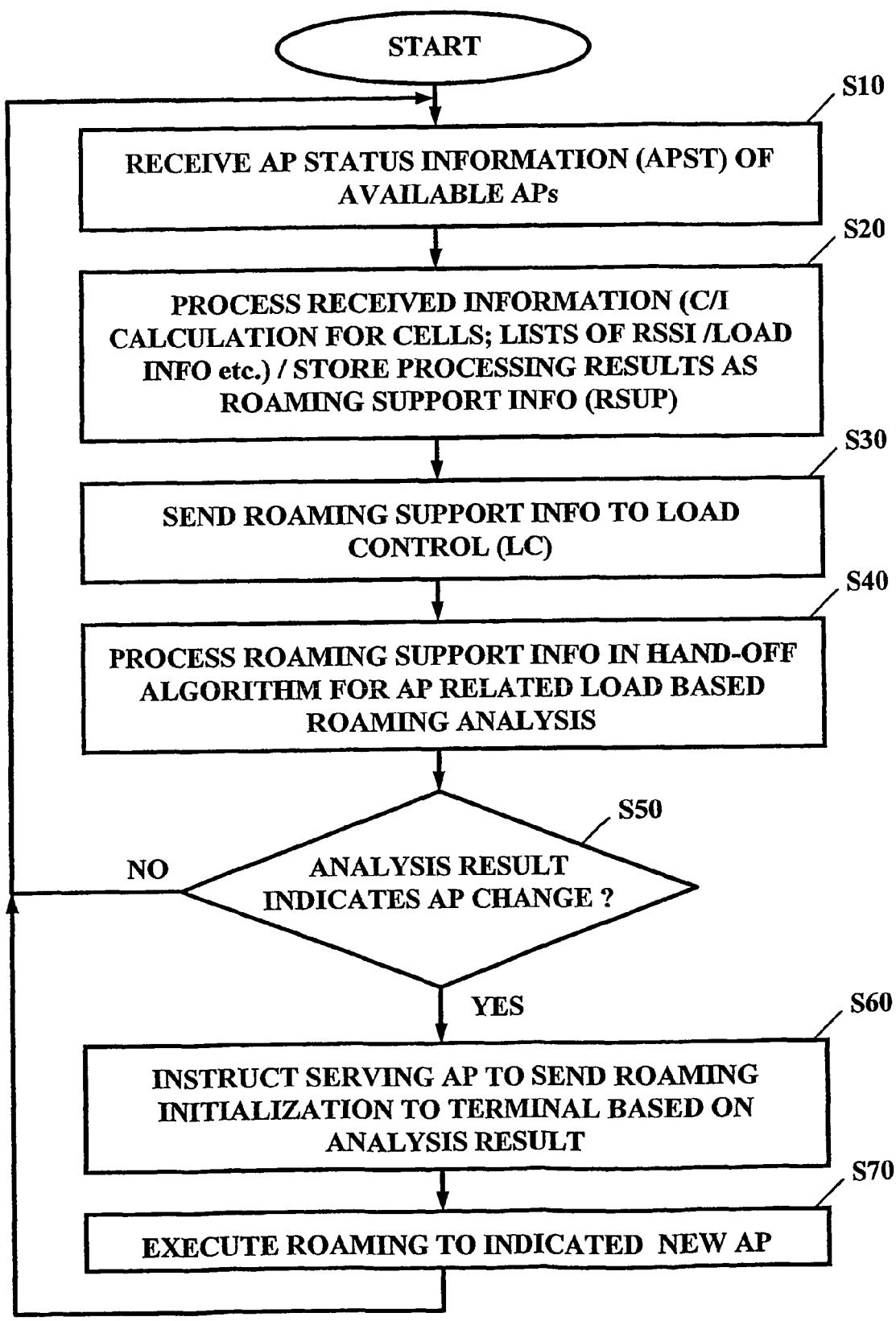
FIG. 3 shows a flowchart of a load balancing method according to the first embodiment.

Referring to FIGS. 2 and 3, a roaming based on a load balancing functionality is described in further detail.

In FIG. 2, a block circuit diagram of a load balancing system in the WLAN according to the first embodiment is shown. In FIG. 3, a flow chart illustrating a method for load balancing in a wireless communication network is illustrated.

For the sake of simplicity, in FIG. 2, only one subscriber terminal T1 is illustrated for which load balancing, i.e. a roaming decision, is to be made. However, the procedure described below is applicable for a plurality of subscriber terminals in parallel.

According to FIG. 2, the APs comprise an access point load status monitoring means (APLSM) 11, 12, 13 which is adapted to determine a traffic load in the respective AP1, AP2, and AP3. Furthermore, a load control device (LC) 21, 22, 23 is comprised in the APs which is adapted to perform a load based roaming analysis which is related to access point specific information and to initialize a roaming procedure of the subscriber terminal. The load control device 21 is activated for a subscriber terminal T1, which is associated with the AP1, i.e. for which the AP is the serving AP (indicated by the dotted boxes of LC 22 and 23). On the other hand, the subscriber terminal T1 comprises a roaming support means 30, which is adapted to process data and generate information, which are used in connection with the load balancing.

The traffic load situation may be determined in the AP as follows. The AP knows the number of clients associated, for example, by checking a list of identification elements stored for associated subscriber terminals, e.g. corresponding MAC addresses thereof. Additionally, simultaneous traffic of the associated subscriber terminals is monitored. The traffic-based estimation could have also some timing window which is observed over certain period of transmit samples. This is used as an indicator for the traffic load, e.g. in the form "transmit samples=traffic load". This could be averaged and used as a parameter for the load information.

The load information is transmitted by the APs, for example, in form of an AP status information (APST), which may be included in the beacon frame sent by the APs. This means that all subscriber terminals, which are in range of the APs can receive this load information by the regularly transmitted signaling information from the APs. The APST further includes an information element (e.g. MAC address) of the sending AP in order to enable an allocation of the load information to the corresponding AP. Furthermore, in case of, e.g., a 802.11h WLAN, also dynamic frequency selection (DFS) and transmit power control (TPC) information may be included in the signaling information. (APST) from the APs.

The subscriber terminal may perform measurements of the communication connection quality during a silent period. In the present example, the roaming support means 30 of the subscriber terminal T1 receives APST from AP1, AP2, and AP3 via the wireless communication interface (step S10 in FIG. 3). The roaming support means 30 performs a processing of the received information in order to generate roaming support information (RSUP, step S20 in FIG. 3). In this processing, for example, a statistic (or table or list) of the load situation of the available (i.e. received). APs is formed. Furthermore, for all available APs, a received signal strength indicator (RSSI) measurement, which is commonly known for those skilled in the art, is executed in the subscriber terminal, e.g. by means of its processor. The RSSI measurements and load information determination are allocated to the received APs by means of the MAC addresses of the APs and statistics (tables or lists) thereof are formed.

Additionally, a carrier to interference ratio (C/I) for the communication connection between each client (i.e. the subscriber terminal T1) and the available APs (i.e. per each cell) may be calculated by the subscriber terminal T1 on the basis of the received signaling information. The C/I can be used as an indicator for the connection quality with a specific AP.

As an optional further information, a terminal transmit power status can be determined on the subscriber terminal side. This is useful in the case of a static power control. However, in IEEE 802.11h based networks, an AP controlled transmit power for the subscriber terminals is used, i.e. where transmit power step status is available.

Moreover, the APST may comprise load information indicating the load status of the subscriber terminal itself. This means, the subscriber terminal measures, e.g. in a predetermined period of time, the amount of transmitted data and forms a corresponding statistic.

The roaming support means 30 may collect and determine these information (APST) for a predetermined period of time and form the roaming support information RSUP on the basis of these collected information. For this purpose, the information and processing results can be stored in a corresponding memory of the subscriber terminal. However, also other criteria for stopping the formation of the RSUP are possible, for example an instruction from the user, an indication from the serving AP or the like.

When the formation of the RSUP is finished (e.g. after the predetermined period of time), the roaming support means 30 sends the RSUP via the interface means of the subscriber terminal T1 to the serving AP1, i.e. to the load control device 21 of the serving AP1 (step S30 in FIG. 3). The load control device 21 processes the received RSUP in order to perform an AP related load based roaming analysis (step S40 in FIG. 3).

In detail, the load control device 21 determines from the RSSI list included in the RSUP the APs, which are suitable to be a candidate for a roaming of the subscriber terminal T1, i.e. which APs provide a sufficient signal strength. For example, the RSSI has to reach a predetermined threshold. From the load information related to the available APs, the load control device 21 can directly determine which capacity the respective available APs have. The load control device may comprise a dynamically adjustable threshold value for each AP of the WLAN which indicates an "overload" situation. This means, it is determined how many simultaneous users are allowed and how low a throughput rate for the AP may be decreased. When a transmit power status is included in the RSUP, it is possible to determine whether the available APs, i.e. the cells thereof, are "equal" cells. This means, it is determined whether, the subscriber terminal transmit power is in suitable level for the respective AP to receive the transmission. It is to be noted that the transmit power may differ from cell to cell, depending on the network planning. Furthermore, the C/I statistics included in the RSUP can be used to determine signaling quality for the cells.

All information included in the RSUP is related to the APs by means of the information elements (MAC addresses). Thus, it is possible to exactly determine the communication and load situations for each of the AP1, AP2, and AP3.

The AP related load based roaming analysis executed in the load control device 21 uses, for example, a hand-off algorithm whose parameters are derived from the RSUP information (i.e., for example, RSSI, C/I, load information, transmit power status). The processor of the (serving) AP may be used for the calculation of the hand-off algorithm. The structure of such a hand-off algorithm is manufacturer dependent and depends, for example, on the network structure, settings for minimal signaling requirements and the like. The hand-off algorithm used for the AP related load based roaming analysis according to the present example is similar to those conventionally used and known for those skilled in the art. It is to be noted that existing and even future hand-off algorithms can be easily adapted by those skilled in the art so that the concept of the proposed load balancing functionality (i.e. the AP related load based roaming analysis) can be implemented. It is obvious for a skilled person how to use the derived parameters within these manufacturer specific hand-off algorithms so that the desired result is obtained.

Furthermore, it is possible that the parameters derived from the RSUP information are differently weighted. This means that the different status information, such as RSSI, C/I, load information and the like, can be prioritized. For example, the parameter related to the load information is weighted higher (has a higher priority) than the parameter related to the C/I, in particular when it is decided that an AP is "overloaded". Thus, it is possible to use a "backdoor" in the roaming decision, i.e. to force a roaming to an AP even if the signal quality is not sufficient in normal cases. Additionally, the weighting can be set flexibly, for example on the basis of the overall traffic situation. For example, when the load situation of the AP is critical (traffic load is above a predetermined threshold), the parameter related to the load information is provided with a higher priority by the load control device 21 than in cases with a lower traffic load. Thus, it is possible to flexibly set the criteria for the decision for a roaming.

It is to be noted that the above described weightings are only an example and adjustable by an operator according to his/her choices.

Alternatively, for calculating the hand-off algorithm, the load control device 21 may use load information directly received from the serving AP load information. Thus, the most current load information can be used at least for the serving AP in the AP related load based roaming analysis.

On the basis of the results of the hand-off algorithm, the load control device 21 decides whether a roaming procedure is to be initialized for the subscriber terminal T1 (step S50 in FIG. 3) This means, the load control device determines whether an AP is available for the subscriber terminal T1 which provides sufficient communication connection quality and has less traffic load than the present serving AP1. If this is not the case (NO), the serving AP1 is maintained and the load balancing procedure is repeated.

On the other hand, when the load control device 21 decides that there is a "better" AP, a roaming procedure is initialized. For this purpose, the load control device 21 determines the target AP, which results from the AP related load based roaming analysis on the basis of the MAC address included in the RSUP. Then, an instruction (ROAMING) indicating that a roaming to the determined new AP (for example AP2) is to be performed is sent via the serving AP1 to the subscriber terminal T1 (step S60 in FIG. 3). When receiving this roaming instruction, the subscriber terminal T1 executes the roaming to the indicated AP2 in the known manner (step S70 in FIG. 3). Thereafter, the load balancing procedure is repeated in connection with the load control device 22 of AP2 as the new serving AP.

Next, as an exemplary situation, a load balancing procedure according to the first embodiment is described with reference to FIG. 1.

Subscriber terminals T2 and T3 receive signaling information from two APs while subscriber terminal T1 receives signaling information from all 3 APs. The subscriber terminals send their RSUP to their respective serving AP. The load control device of the respective AP processes this RSUP and decides for a roaming of the subscriber terminal in a centralized manner. When, for example, C/I statistics are used the following situation may occur. When it is determined that AP1 is "overloaded". T1 measures the AP1, AP2 and AP3 and forms a statistical database of measurements in form of the RSUP. Since AP1 is overloaded, the analysis of the measurement shows that AP2 is less loaded. Thus, as a preliminary result, AP2 could be used as a target AP for the roaming. However, in this example, AP2 has too close channels, i.e. it is not clean. The C/I statistics shows that neighbor C/I criteria is not fulfilled. On the other hand, the analysis shows that AP3 is also overloaded as well. Then the selection for the roaming is to use an "unclean" channel in AP2.

The load balancing functionality can be implemented, for example, by software code potions, which are loaded into the respective network elements (subscriber terminal, access point) by means of its reading means and its memories. The access points are able to receive the additional information RSUP from the subscriber terminals and to forward it to the load control device.

Next, a second embodiment will be described with reference to FIGS. 4 to 7.

It is to be noted that some of the means, functionality and procedures of the second embodiment are parallel to corresponding means, functionality and procedures of the first embodiment. Thus, a repetition of a detailed description thereof is omitted.

Figure 4:
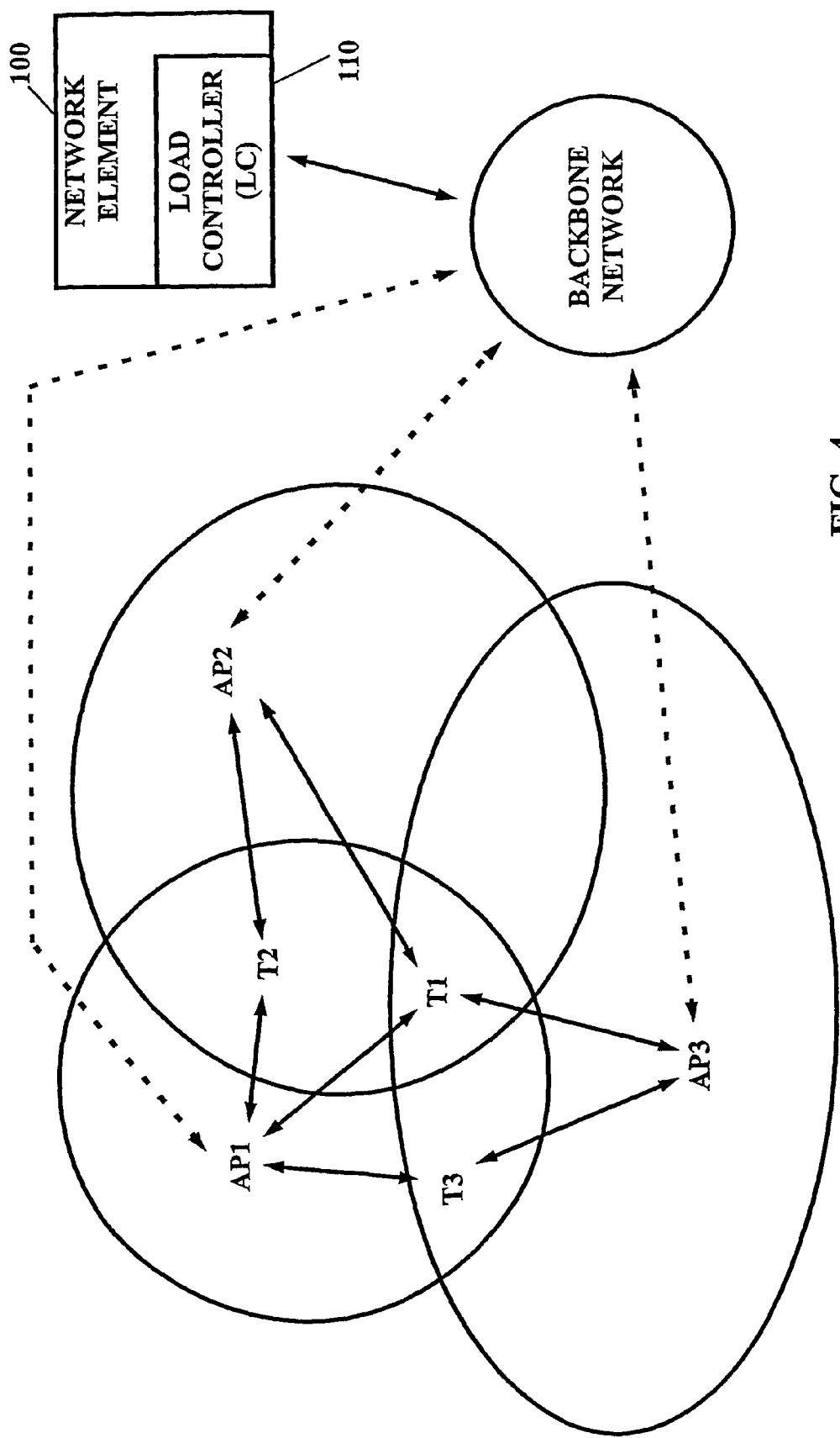
FIG. 4 shows a schematic diagram of a WLAN network according to a second embodiment of the present invention.

FIG. 4 shows a wireless communication network such as a WLAN comprising several access points AP1, AP2, AP3 as communication control elements, a backbone network as a distribution network for connecting the APs to one another and to external destination points such as other WLANs or fixed networks. Furthermore, a separate network element 100 is provided which comprises a load control device (LC) 110. The separate network element 100 is connected to the access points by the backbone network for exchanging data.

Subscriber terminals T1, T2, T2 located in cells defined by the access points AP1, AP2, AP3 may be associated (connected) with one AP (serving AP). In the present example, as the starting situation, subscriber terminal T1 is associated with AP1, T2 is associated with AP2, and T3 is associated with AP3.

The basic elements of the subscriber terminals and the access points are similar to those described in the first embodiment. The separate network element 100 may have a similar structure like an access point, and comprise (not shown) at least a processor, memory means, input means, reading means, interface means and the like.

In the WLAN depicted in FIG. 4, a subscriber terminal receives signaling data from those APs in whose cells it is located. This means, T1 receives signaling data from AP1, AP2, AP3, T2 receives signaling data from AP1, AP2, and T3 receives signaling data from AP1, AP3. The signaling data may be used to determine the connection quality situation for the subscriber terminal, i.e. whether there is an AP other than the current serving AP, which provides a better communication situation. The signaling data comprises load information determined in the APs, which is associated with an identification element identifying the sending AP.

On the other hand, the subscriber terminal sends data based on the received signaling data to its respective serving AP. The AP forwards this data to the network element 100. Furthermore, the APs are adapted to send separate monitoring information to the network element 100.

The network element 100 processes the forwarded data from the subscriber terminal and may send a processing result to the subscriber terminal via the backbone network and the serving AP.

Figure 5:
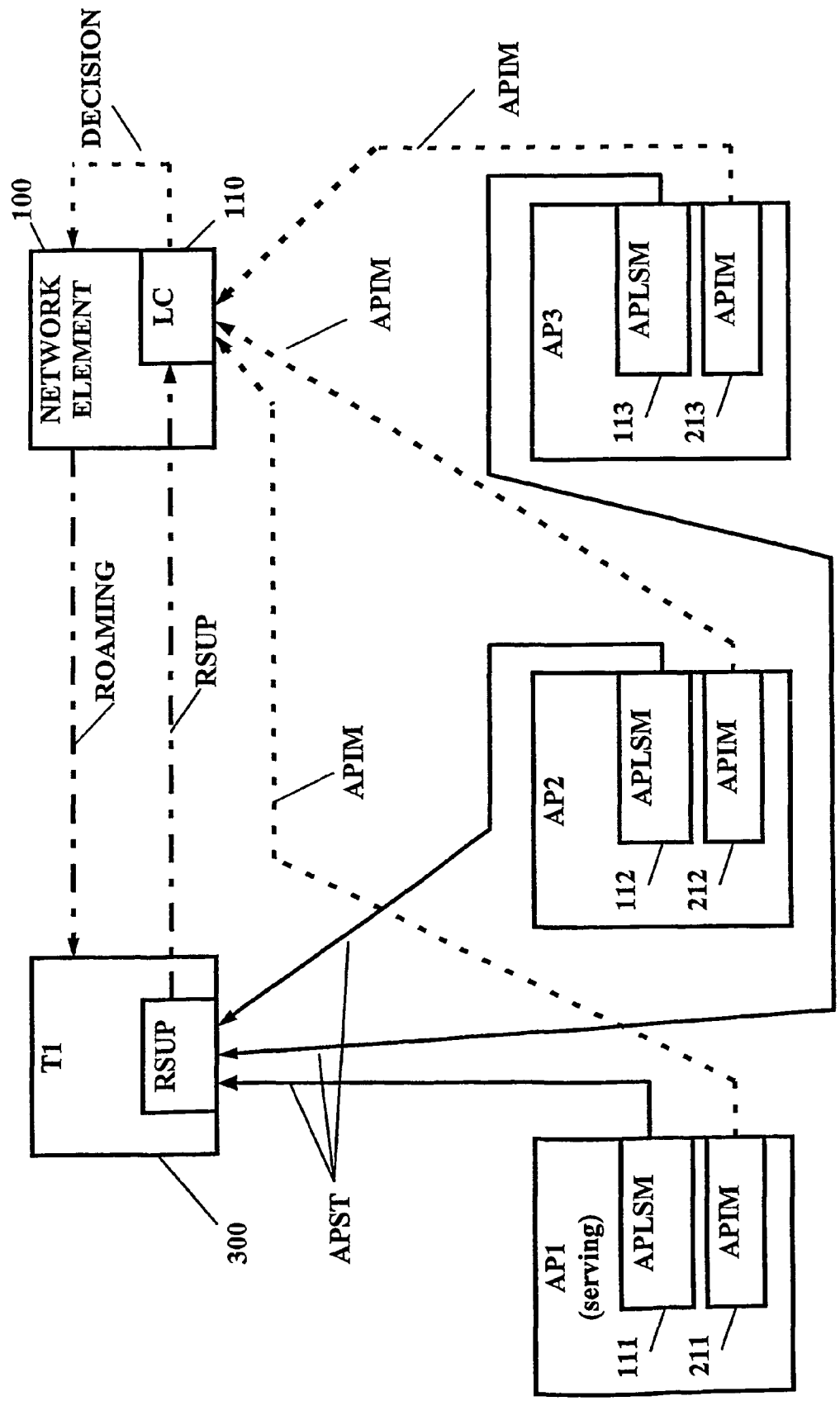
FIG. 5 shows a block circuit diagram of a load balancing system according to the second embodiment.
Figure 6:
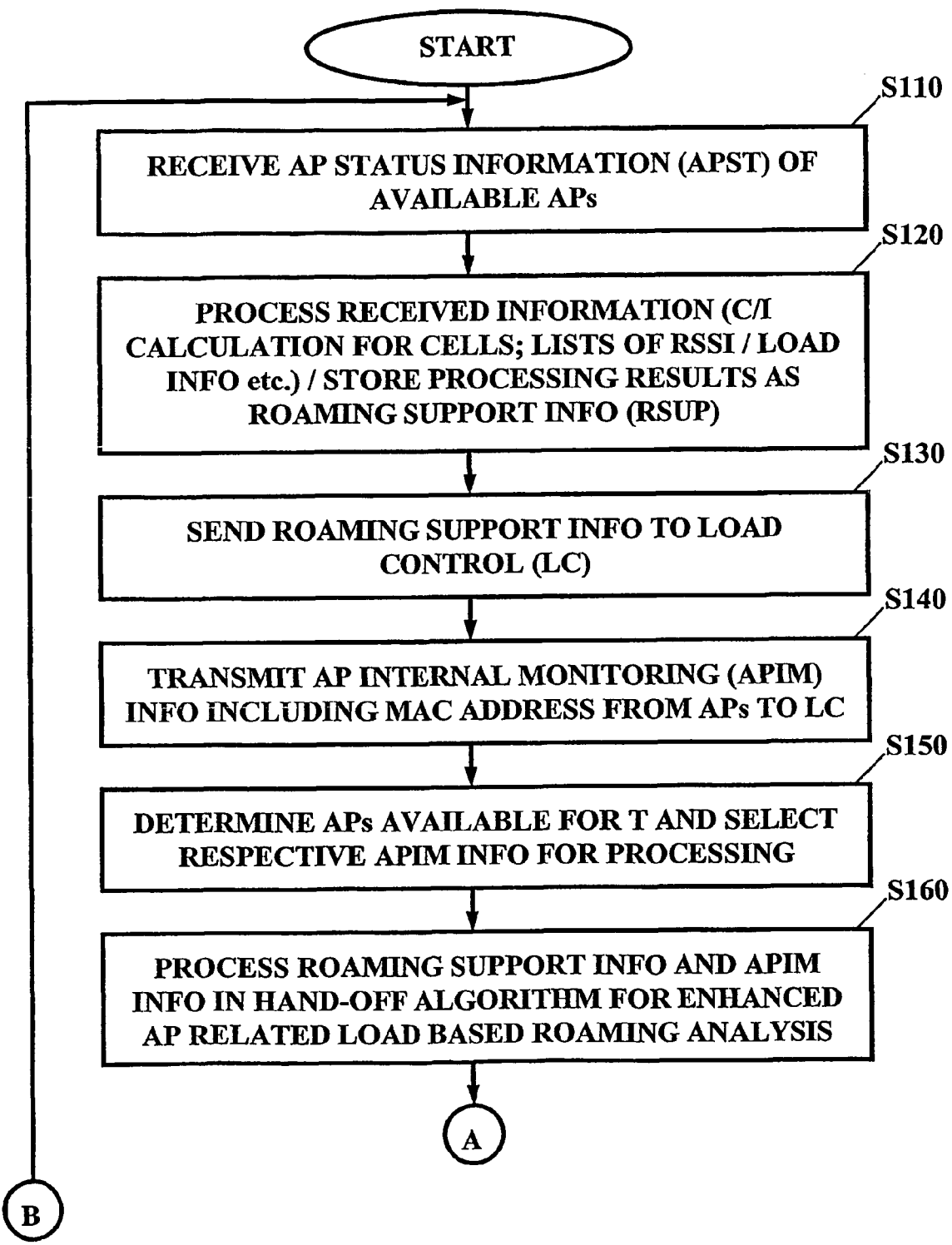
FIGS. 6 and 7 shows a flowchart of a load balancing method according to the second embodiment.
Figure 7:
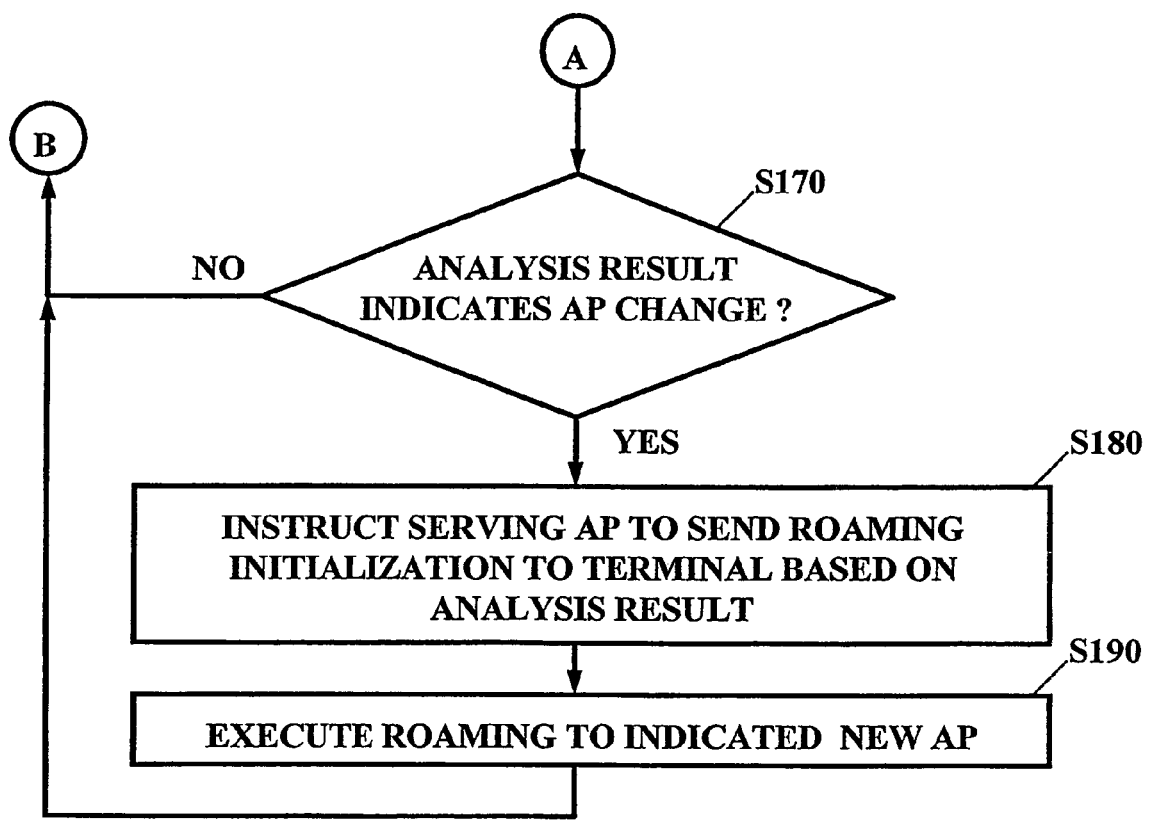

Referring to FIGS. 5 to 7, a roaming based on a load balancing functionality is described in further detail.

In FIG. 5, a block circuit diagram of a load balancing system in the WLAN according to the second embodiment is shown. In FIGS. 6 and 7, a flow chart illustrating a method for load balancing in a wireless communication network is illustrated.

For the sake of simplicity, in FIG. 5, only one subscriber terminal T1 is illustrated for which load balancing, i.e. a roaming decision, is to be made. However, the procedure described below is applicable for a plurality of subscriber terminals in parallel.

According to FIG. 5, the APs comprise an access point load status monitoring means (APLSM) 111, 112, 113, which is adapted to determine a traffic load in the respective AP1, AP2, and AP3. Furthermore, the access points comprise an access point internal monitoring means (APIM) 211, 212, 213, which is adapted to measure an external interference, to form a statistic thereof and to sent the statistic, for example, in the form of access point internal monitoring information (APIM) directly to the load control device 110. The external interference of the AP may be caused by another AP in the network, by another non-WLAN system, such as a Bluetooth client/AP or the like. This external interference may be determined, for example, on the basis of measurements of retransmit rates of the AP, monitoring results of back-off windows for each subscriber terminal associated with the respective AP, determination of net allocation vector (NAV) lists for possible hidden subscriber terminals, and the like. This means, the APIM includes information concerning an external interference of the AP itself which can not be determined by measurements in the subscriber terminal T1. Of course, the APIM can be identified to belong to a specific AP, e.g. by including the MAC address of the AP.

On the other hand, the subscriber terminal T1 comprises a roaming support means 110, which is adapted to process data and generate information which are used in connection with the load balancing.

The network element 100 comprises the load control device 110 which is adapted to perform an enhanced load based roaming analysis which is related to access point specific information and to initialize a roaming procedure of the subscriber terminal. The load control device 110 located in the separate network element 100 is in charge of all the APs connected thereto and supporting the load balancing (in the present example AP1, AP2, AP3).

The traffic load situation may be determined in the AP by the APLSM 111, 112, 113 as described in connection with the first embodiment and sent to the roaming support means 300 of the subscriber terminal T1 in range by means of load information included in access point status information (APST). The APST further includes an information element (e.g. MAC address) of the sending AP in order to enable an allocation of the load information to the corresponding AP.

Furthermore, in case of,. e.g., a 802.11h WLAN, also dynamic frequency selection (DFS) and transmit power control (TPC) information may be included in the signaling information (APST) from the APs.

The subscriber terminal T1 may perform measurements of the communication connection quality during a silent period. In the present example, the roaming support means 300 of the subscriber terminal T1 receives APST from AP1, AP2, and AP3 (step S110 in FIG. 6). The roaming support means 300 performs a processing of the received information in order to generate roaming support information (step S120 in FIG. 6). In this processing, for example, a statistic (or list) of the load situation of the available (i.e. received) APs, a received signal strength indicator (RSSI) measurement ad the like is formed. The RSSI measurements and load information determination are allocated to the received APs by means of the MAC addresses of the APs.

Additionally, statistics related to a carrier to interference ratio (C/I), a terminal transmit power status, load information indicating the load status of the subscriber terminal itself may be formed in the roaming support means 300.

The roaming support means 300 may collect and determine these information for a predetermined period of time and form the RSUP on the basis of these collected information. For this purpose, the information and processing results can be stored in a corresponding memory of the subscriber terminal. However, also other criteria for stopping the formation of the RSUP are possible, for example an instruction from the user, an indication from the serving AP or the like.

When the formation of the RSUP is finished (e.g. after the predetermined period of time), the roaming support means 300 sends the RSUP via the serving AP1 and the backbone network to the load control device 110 of the network element 100 (step S130 in FIG. 6). It is to be noted, that for the sake of simplicity, in FIG. 5, data exchange between the subscriber terminal T1 and the network element 100 is shown to be direct. However, in practice, transmission there between is performed via the serving AP of the subscriber terminal and the backbone network.

Thus, steps S110, S120, and S130 are similar to steps S10, S20 and S30 of the first embodiment except that the information are sent to the load control device 110 in the separate network element 100.

In parallel to the APST and RSUP related measures, the access point internal monitoring means 211, 212, 213 of AP1, AP2, and AP3, respectively, determine the information related to the external interference and send corresponding APIM to the load control device 110 (step S140 in FIG. 6). Preferably, the determination and transmission of the APIM in the APs is executed in correspondence (synchronously) with the determination and transmission of the RSUP in the subscriber terminals, i.e., for example, in predetermined time periods.

Next, the load control device 110 determines and selects those APIM, which are sent from APs being available for the subscriber terminal T1. This can be achieved, for example, by comparing the MAC addresses included in the RSUP and the APIM so that only APIM of those APs are considered for a further processing which are also received by the subscriber terminal T1 (step S150 in FIG. 6).

The load control device 110 now processes the RSUP from the subscriber terminal T1 and the selected APIM from the access points AP1, AP2, AP3 in order to perform an enhanced AP related load based roaming analysis (step S160 in FIG. 6).

In detail, the load control device 110 determines from the RSSI list included in the RSUP the APs, which are suitable to be a candidate for a roaming of the subscriber terminal T1, i.e. which APs provide a sufficient signal strength. For example, the RSSI has to reach a predetermined threshold. From the load information related to the available APs, the load control device 110 can directly determine which capacity the respective available APs have. The load control device may comprise a dynamically adjustable threshold value for each AP of the WLAN, which indicates an "overload" situation. This "overload threshold value may be transmitted directly from the APs, e.g. by means of the APIM. When a transmit power status is included in the RSUP, it is possible to determine whether the available APs, i.e. the cells thereof, are "equal" cells. Furthermore, the C/I statistics included in the RSUP can be used to determine signaling quality for the cells. All information included in the RSUP are related to the APs by means of the information elements (MAC addresses). Thus, it is possible to exactly determine the communication and load situations for each of the AP1, AP2, and AP3. Additionally, the load control device 110 determines from the APIM whether an AP is subjected to an external interference, which may influence the connection quality to a subscriber terminal.

The enhanced AP related load based roaming analysis executed in the load control device 110 uses, for example, an adapted hand-off algorithm whose parameters are derived from the RSUP information (i.e., for example, RSSI, C/I, load information, transmit power status) and the APIM information (i.e., for example, retransmit rate, back-off window, and the like). The processor of the (serving) AP may be used for the calculation of the adapted hand-off algorithm. The structure of such a hand-off algorithm is manufacturer dependent and depends, for example, on the network structure, settings for minimal signaling requirements and the like. The hand-off algorithm used for the enhanced AP related load based roaming analysis according to the present example is similar to those conventionally used and known for those skilled in the art. It is to be noted that existing and even future hand-off algorithms can be easily adapted by those skilled in the art so that the concept of the proposed load balancing functionality (i.e. the enhanced AP related load based roaming analysis) can be implemented. It is obvious for a skilled person how to use the derived parameters within these manufacturer specific hand-off algorithms so that the desired result is obtained.

Furthermore, it is possible that the parameters derived from the RSUP information and the APIM information is differently weighted. This means that the different status information and/or interference information, such as RSSI, C/I, load information, retransmit rates and the like, can be prioritized. For example, the parameter related to the load information is weighted higher (has a higher priority) than the parameter related to the C/I, in particular when it is decided that an AP is "overloaded". On the other hand, parameters related to an external interference are weighted higher than parameters related to a received signal strength. Thus, it is possible to use a "backdoor" in the roaming decision, i.e. to force a roaming to an AP even if the signal quality is not sufficient in normal cases. Additionally, the weighting can be set flexibly, for example on the basis of the overall traffic situation. For example, when the load situation of the AP is critical (traffic load is above a predetermined threshold), the parameter related to the load information is provided with a higher priority by the load control device 110 than in cases with a lower traffic load. Thus, it is possible to flexibly set the criteria for the decision for a roaming.

It is to be noted that the above described weightings are only an example and adjustable by an operator according to his/her choices.

On the basis of the results of the hand-off algorithm, the load control device 110 decides whether a roaming procedure is to be initialized for the subscriber terminal T1 (step S170 in FIG. 7) This means, the load control device 110 determines whether an AP is available for the subscriber terminal T1 which provides sufficient communication connection quality and has less traffic load than the present serving AP1. If this is not the case (NO), the serving AP1 is maintained and the load balancing procedure is repeated.

On the other hand, when the load control device 110 decides that there is a "better" AP, a roaming procedure is initialized. For this purpose, the load control device 110 determines the target AP, which results from the enhanced AP related load based roaming analysis on the basis of the MAC address included in the RSUP and the APIM. Then, an instruction (ROAMING) indicating that a roaming to the determined new AP (for example AP2) is to be performed is sent via the serving AP1 to the subscriber terminal T1 (step S180 in FIG. 7). When receiving this roaming instruction, the subscriber terminal T1 executes the roaming to the indicated AP2 in the known manner (step S190 in FIG. 7). Thereafter, the load balancing procedure is repeated in connection with the new serving AP2 and the load control device 110 of the network element 100.

Next, as an exemplary situation, a load balancing procedure according to the first embodiment is described with reference to FIG. 4.

Subscriber terminals T2 and T3 receive signaling information from two APs while subscriber terminal T1 receives signaling information from all 3 APs. The subscriber terminals send their RSUP to their respective serving AP. The serving APs forward the RSUP to the load control device 110 in the separate network element 100. Additionally, the APs send the APIM to the load control device 110. When a roaming decision for subscriber terminal T1 is to be made, the load control device 110 selects all received APIM for the further processing. The load control device 110 processes the RSUP and APIM and decides for a roaming of the subscriber terminal in a centralized manner. For example, there might be a situation that it is determined that AP1 is "overloaded", and the enhanced analysis of the measurement shows that AP2 and AP3 are less loaded. Both AP2 and AP3 have a sufficient C/I. Further, AP2 has a better RSSI statistic than AP3. However, AP2 is subjected to external interference, which is derived from the APIM. Thus, the load control device 110 decides that the subscriber terminal T1 has to perform a roaming to AP3. The load balancing functionality can be implemented, for example, by software code potions, which are loaded into the respective network elements (subscriber terminal, access point, network element) by means of its reading means and its memories. The access points are able to receive the additional information RSUP from the subscriber terminals and to forward it to the load control device.

Since the load control device is implemented in a fixed network element (AP or separate network element) there can be used more sophisticated processing measures (e.g. hand-off algorithms) and greater storing capacities in comparison to the rather restricted capabilities of a (mobile) subscriber terminal.

It is to be noted that features of one of the embodiments described above are also adaptable in the other embodiment. For example, the load control device in the first embodiment may be located in a separate network element connected to the APs by the backbone network. Furthermore, in the second embodiment, the load control device may be located in each of the APs. Then, the APs are adapted to receive the APIM from the other APs.

Moreover, even though the above description is related to a WLAN, the present invention is also applicable to other wireless network types, such as mobile telecommunication networks and the like.

The load balancing functionality can be implemented in existing systems even if there are network elements (subscriber terminals, access points), which do not support the load balancing functionality. In such a case, as for example described in the IEEE 802.11 standard, information concerning the load balancing can be ignored by those network elements which do not understand this information, and a normal roaming procedure not based on load information is performed.

As described above, by using a load balancing functionality in an access point (i.e. serving access point) or in a separate network element connected to the access points of the wireless communication network, measurements of a subscriber terminal are processed in a centralized manner. Thus, the load balancing functionality can consider load information from a plurality of access points and also from a plurality of subscriber terminals. This means that an improved load balancing is possible since the decision whether the subscriber terminal has to roam is based on an extended set of information. For example, the load balancing functionality can consider "future" events, when another subscriber terminal will change the AP, so that more capacity in the present AP will be available. By having the decision making in the AP side load control device or in the separate network element side load control device that monitors the whole wireless communication network, the undesired ping-pong effect can be decreased. The load controlling is executed in a more "timing" based manner i.e. there would be slightly longer analyzing periods over the hand-off (roaming) decisions. Also this represents a support in situations in which subscriber terminals does not have a possibility for sophisticated measurements and hand-off algorithms. Hence, the traffic load over the whole wireless communication network is equalized.

As described above, for load balancing in a wireless communication network comprising at least one subscriber terminal T1, T2, T2 and a plurality of access points AP1, AP2, AP3, a load control device 21, 110 is used which is located outside of said subscriber terminal, wherein said load control device is adapted to process information related to a load in said wireless communication network and to instruct roaming of said subscriber terminal from an associated access point to another one of said plurality of access points. Access point status information APST determined in said plurality of access points S10, S110 is received and communication status information related to said plurality of access points S20, S120 is determined. The subscriber terminal processes S20, S120 these information into roaming support information RSUP, which are in turn processed S40, S160 in said load control device an access point related load based roaming analysis. On this basis, it is decided S50, S170 by the load control device, whether said subscriber terminal is to be associated with another one of said plurality of access points.

It should be understood that the above description and accompanying figures are merely intended to illustrate the present invention by way of example only. The preferred embodiments of the present invention may thus vary within the scope of the attached claims.

The invention claimed is:

1. A method, comprising:
receiving, in a subscriber terminal, access point status information determined in a plurality of access points;
determining, in the subscriber terminal, communication status information related to said plurality of access points;
processing, in the subscriber terminal, said received access point status information and said communication status information in order to obtain roaming support information; and sending, from the subscriber terminal, said obtained roaming support information to a load control device, the load control device being located externally to the subscriber terminal.

2. The method according to claim 1, wherein the access point status information comprises an access point identification element and an access point load status indicator determined in a respective access point.

3. The method according to claim 1, further comprising determining the communication status information on the basis of at least one of a received signal strength indicator indicating the received signal strength of said plurality of access points, a carrier to interference ratio per each access point, and a terminal transmit power status.

4. The method according to claim 1, wherein said roaming support information, obtained in the processing of the received access point status information and the communication status information comprises statistics of access point related communication status and load information derived from said received access point status information.

5. An apparatus, comprising:
   a subscriber terminal portion;
   a receiver configured to receive access point status information determined in a plurality of access points;
   a determiner configured to determine communication status information related to the plurality of access points;
   a processor configured to process the received access point status information and the communication status information in order to obtain roaming support information; and
   a transmitter configured to send the obtained roaming support information to a load control device, the load control device being located externally to the subscriber terminal.

6. The apparatus according to claim 5, wherein the access point status information comprises an access point identification element and an access point load status indicator determined in a respective access point.

7. The apparatus according to claim 5, wherein said determiner is configured to determine at least one of a received signal strength indicator indicating the received signal strength of said plurality of access points, a carrier to interference ratio per each access point, and a terminal transmit power status, as said communication status information.

8. The apparatus according to claim 5, wherein said roaming support information obtained by said processor from said received access point status information and said communication status information comprises statistics of access point related communication status and load information derived from said received access point status information.

9. A computer program product embodied on a computer readable medium, the computer program product being configured to execute a method in a subscriber terminal, the method comprising:
   receiving access point status information determined in a plurality of access points;
   determining communication status information related to said plurality of access points;
   processing said received access point status information and said communication status information in order to obtain roaming support information; and
   sending, from the subscriber terminal, said obtained roaming support information to a load control device, the load control device being located externally to the subscriber terminal.

* * * * *